United States Patent
Huang et al.

(10) Patent No.: US 8,928,651 B2
(45) Date of Patent: Jan. 6, 2015

(54) DISPLAY AND POWER SUPPLY CONTROL METHOD OF A DISPLAY

(75) Inventors: Hung-Min Huang, Hsin-Chu (TW); Shih-Chieh Kuo, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 374 days.

(21) Appl. No.: 13/423,293

(22) Filed: Mar. 19, 2012

(65) Prior Publication Data
US 2013/0063414 A1 Mar. 14, 2013

(30) Foreign Application Priority Data

Sep. 13, 2011 (TW) .............................. 100132844 A

(51) Int. Cl.
*G09G 5/00* (2006.01)
*G06F 1/32* (2006.01)

(52) U.S. Cl.
CPC ............ *G06F 1/3265* (2013.01); *G06F 1/3218* (2013.01); *G09G 2310/08* (2013.01); *G09G 2330/06* (2013.01); *Y02B 60/1242* (2013.01)
USPC .......................................... 345/213; 345/211

(58) Field of Classification Search
CPC ............. G09G 3/30; G09G 5/00; G09G 3/36; G09G 5/10; G06F 3/08
USPC ...................... 345/52, 98–100, 211–212, 214
See application file for complete search history.

(56) References Cited

U.S. PATENT DOCUMENTS

| | | | |
|---|---|---|---|
| 5,910,887 A | 6/1999 | Kim | |
| 6,965,365 B2 * | 11/2005 | Nakamura | 345/87 |
| 7,365,717 B2 | 4/2008 | Lee | |
| 7,602,386 B2 * | 10/2009 | Maekawa | 345/204 |
| 7,760,163 B2 * | 7/2010 | Jo | 345/76 |
| 2004/0196278 A1 * | 10/2004 | Kida et al. | 345/211 |
| 2005/0285834 A1 * | 12/2005 | Nakata | 345/88 |
| 2011/0032282 A1 * | 2/2011 | Kasai et al. | 345/690 |

* cited by examiner

*Primary Examiner* — Andrew Sasinowski
(74) *Attorney, Agent, or Firm* — Winston Hsu; Scott Margo

(57) ABSTRACT

A display includes a display panel, a pixel driving unit and a power supply for supplying power to the pixel driving unit. The display panel includes a plurality of pixels arranged in a matrix manner. The pixel driving unit is used for driving the pixels. The power supply includes an input power source, an output capacitor for providing an output voltage, and a control unit for controlling the input power source, such that in a frame period, the input power source charges the output capacitor during the non-refreshing duration of the pixels by the input power source and stops charging the output capacitor during the refreshing duration of the pixels.

20 Claims, 7 Drawing Sheets

DISPLAY AND POWER SUPPLY CONTROL METHOD OF A DISPLAY

BACKGROUND OF THE INVENTION

1. Field of the Invention

The present invention relates to displays, and particularly to a power supply of a display.

2. Description of the Prior Art

Please refer to FIG. 1, which is a block diagram of a driving structure of a display 100. The display 100 includes an AC/DC converter 110, a pixel driving unit 120, a panel 130 having a plurality of pixels 131, a switching-type DC/DC converter 140, and a timing controller (Tcon) 150. The AC/DC converter 110 converts AC power to appropriate DC power, which is provided to the DC/DC converter 140. The DC/DC converter 140 converts the DC power provided by the AC/DC converter 110 to another DC power, which is provided to the pixel driving unit 120 for driving the pixels 131 arranged in a matrix. Moreover, the driving sequence of the plurality of pixels 131 is controlled by the timing controller 150, which generally includes two input units for receiving horizontal synchronization signal (Hsync) and vertical synchronization signal (Vsync), respectively.

Please refer to FIG. 2, which is a diagram of a switching-type boost DC/DC converter. The switching-type boost DC/DC converter 140 includes an input power source 210, a storage inductor 220, a diode 230, an output capacitor 240, a load 250, a switch 260, and a control unit 270. For generating a proper DC output voltage ($V_o$), the control unit 270 controls the switch 260 to turn ON and OFF such that the input power source 210 charges the storage inductor 220 via the current $I_{ON}$, then the power stored in the storage inductor 220 charges the output capacitor 240 via the current $I_{OFF}$. Moreover, the control unit 270 can control the switch 260 by utilizing control modes including pulse width modulation (PWM) and pulse frequency modulation (PFM), for example.

Please refer to FIG. 1 to FIG. 3, where FIG. 3 is a diagram of driving waveforms of a power supply of related art. The waveforms in FIG. 3 include PWM switching voltage ($V_{DS}$) 310, PWM output voltage ($V_o$) 320, PFM switching voltage ($V_{DS}$) 330, PFM output voltage 340, and horizontal synchronization signal 350 and vertical synchronization signal 360 received by the timing controller 150. Please refer to the PWM switching voltage ($V_{DS}$) 310. When the switch 260 is ON (short), the PWM switching voltage ($V_{DS}$) 310 is at a low voltage level, and the input power source 210 charges the storage inductor 220 via the current $I_{ON}$. When the switch 260 is OFF (break), the PWM switching voltage ($V_{DS}$) 310 is at a high voltage level, and the power stored in the storage inductor 220 charges the output capacitor 240 via the current $I_{OFF}$. A high level gate-source voltage ($V_{GS}$) can turn ON the switch 260, and a low level gate-source ($V_{GS}$) voltage can turn OFF the switch 260 when the switch 260 is implemented with an N-type MOSFET, for example. Moreover, the control unit 270 controls the switch 260 for generating the output voltage without switching cooperatively with the horizontal synchronization signal 350 and the vertical synchronization signal 360.

Please refer to PFM switching voltage ($V_{DS}$) 330. The PFM control mode is similar to the PWM control mode in the aspect of charging the storage inductor 220 and the output capacitor 240 in turn. In more detail, the difference is that the PFM control mode charges the storage inductor 220 and the output capacitor 240 a plurality of times with identical charging duration lengths. In one embodiment, the switch 260 can stay in an OFF state, so as not to recharge the storage inductor 220 even when the power stored in the storage inductor 220 is fully discharged. The switch 260 turns ON to charge the storage inductor 220 to prepare power to charge the output capacitor 240 until the output voltage ($V_o$) is lower than a predetermined value relative to a predetermined reference voltage.

U.S. Pat. No. 5,910,887 discloses a control method for a power supply of a display. Please refer to FIG. 7, which is a related PWM control waveform with cooperative switching with the horizontal synchronization signal. The waveforms in FIG. 7 include horizontal synchronization signal 701, original switch waveform 702 including PWM switching voltage ($V_{DS}$) 7021 and storage inductor current 7022, switching noise 703, modified switch waveform 704 including modified PWM switching voltage ($V_{DS}$) 7041 and modified storage inductor current 7042, and modified switching noise 705. In FIG. 7, reference number 706 indicates a horizontal blanking period, and reference number 707 indicates a horizontal active period. U.S. Pat. No. 5,910,887 discloses that the switch 260 can switch ON and switch OFF during two adjacent horizontal blanking periods 706, respectively. Moreover, U.S. Pat. No. 5,910,887 discloses that the switching mode can prevent the effect of the switching noise 703 when the display is refreshing. However, U.S. Pat. No. 5,910,887 does not take into consideration whether restricting the switching time of the power supply would still effectively keep the output voltage of the power supply at a reference voltage or not. In other words, restriction of the switching time of the power supply may lead to a high variance of the output voltage of the power supply, which would cause flicker or brightness variation of a display. Moreover, the issue of power savings is increasingly important due to applications to portable devices. The PFM control mode has the benefit of power savings. However, the control method disclosed in U.S. Pat. No. 5,910,887 cannot be applied to the PFM control mode.

Moreover, the display with DC/DC power supply using a traditional PFM control mode will exhibit a visible stripe in the displayed image when the switching frequency of the DC/DC power supply is low corresponding to a low power consumption condition. However, a higher switching frequency of the DC/DC power supply would lead to higher power consumption.

SUMMARY OF THE INVENTION

Referring to one embodiment of the present invention, a display comprises a panel, a pixel driving unit, and a power supply. The panel comprises a plurality of pixels arranged in a matrix manner. The pixel driving unit drives the plurality of pixels, and the power supply electrically coupled to the pixel driving unit provides an output voltage to the pixel driving unit. Moreover, the power supply comprises an input power source, an output capacitor and a control unit. The output capacitor provides the output voltage to the pixel driving unit. The control unit controls the input power source to charge the output capacitor when not refreshing the pixels and to stop charging the output capacitor when refreshing the pixels in a frame period of the display.

Referring to another embodiment of the present invention, another display comprises a panel, a pixel driving unit, and a power supply. The panel comprises a plurality of pixels arranged in a matrix manner. The pixel driving unit drives the plurality of pixels, and the power supply electrically coupled to the pixel driving unit provides an output voltage to the pixel driving unit. Moreover, the power supply comprises an input power source, an output capacitor and a control unit. The output capacitor provides the output voltage to the pixel driving unit. The control unit controls the input power source to charge the output capacitor in a vertical blanking period of a frame period of the display and to stop charging the output capacitor in a plurality of horizontal blanking periods in the frame period of the display and when refreshing the pixels.

Referring to another embodiment of the present invention, a control method for controlling a power supply of a display which includes a plurality of pixels is disclosed. The power supply control method comprises providing the power supply comprising an output capacitor for supplying an output voltage to the display; in a frame period of the display, charging the output capacitor when not refreshing the pixels; and in the frame period of the display, stopping charging the output capacitor when refreshing the pixels.

Referring to another embodiment of the present invention, another control method for controlling a power supply of a display which includes a plurality of pixels is disclosed. The power supply control method comprises providing the power supply comprising an output capacitor for supplying an output voltage to the display; in a frame period of the display, charging the output capacitor in a vertical blanking period of the frame period of the display; and in the frame period of the display, stopping charging the output capacitor in a plurality of horizontal blanking periods of the display and when refreshing the pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
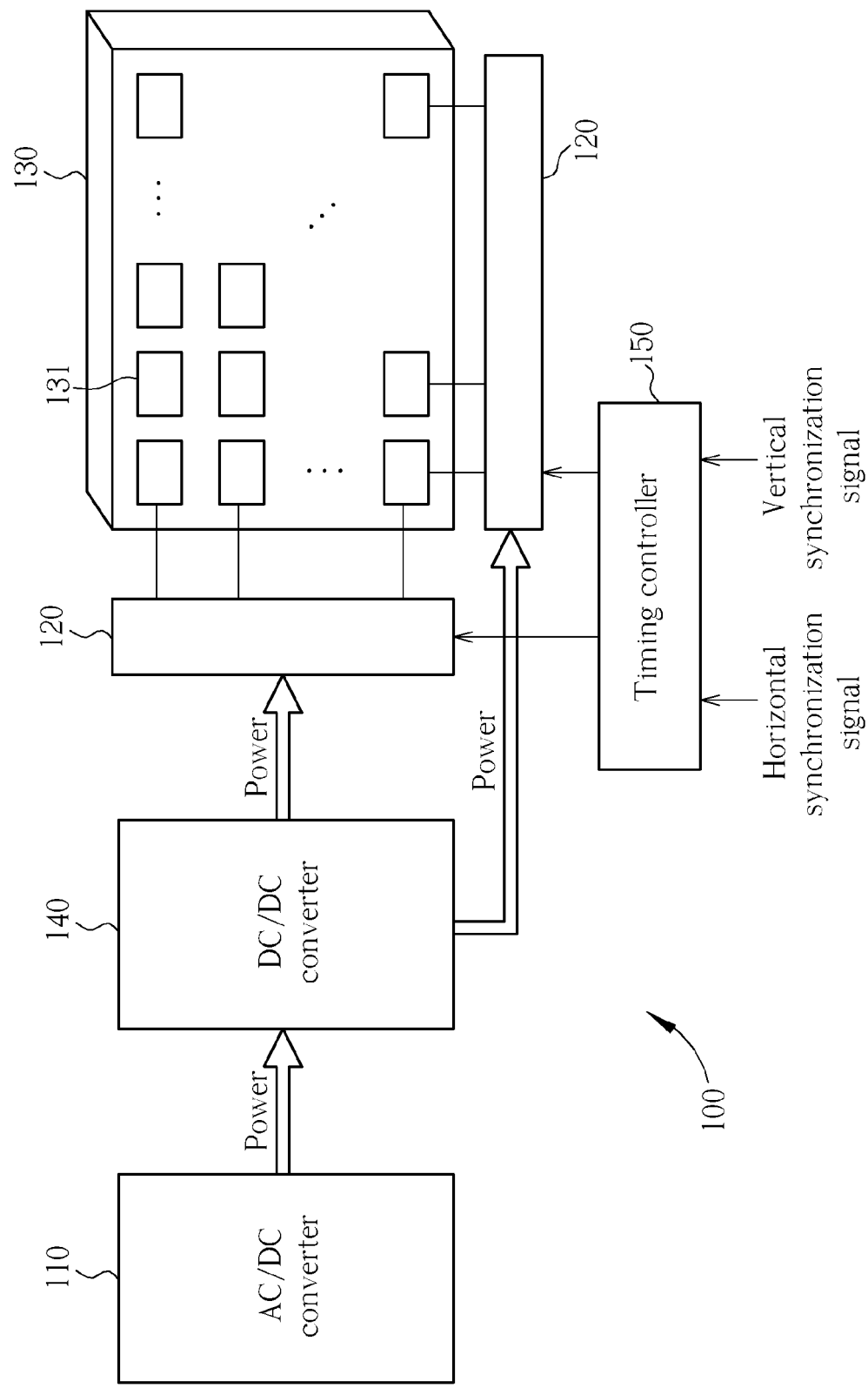
FIG. 1 is a block diagram of a conventional driving structure of a display.
Figure 2:
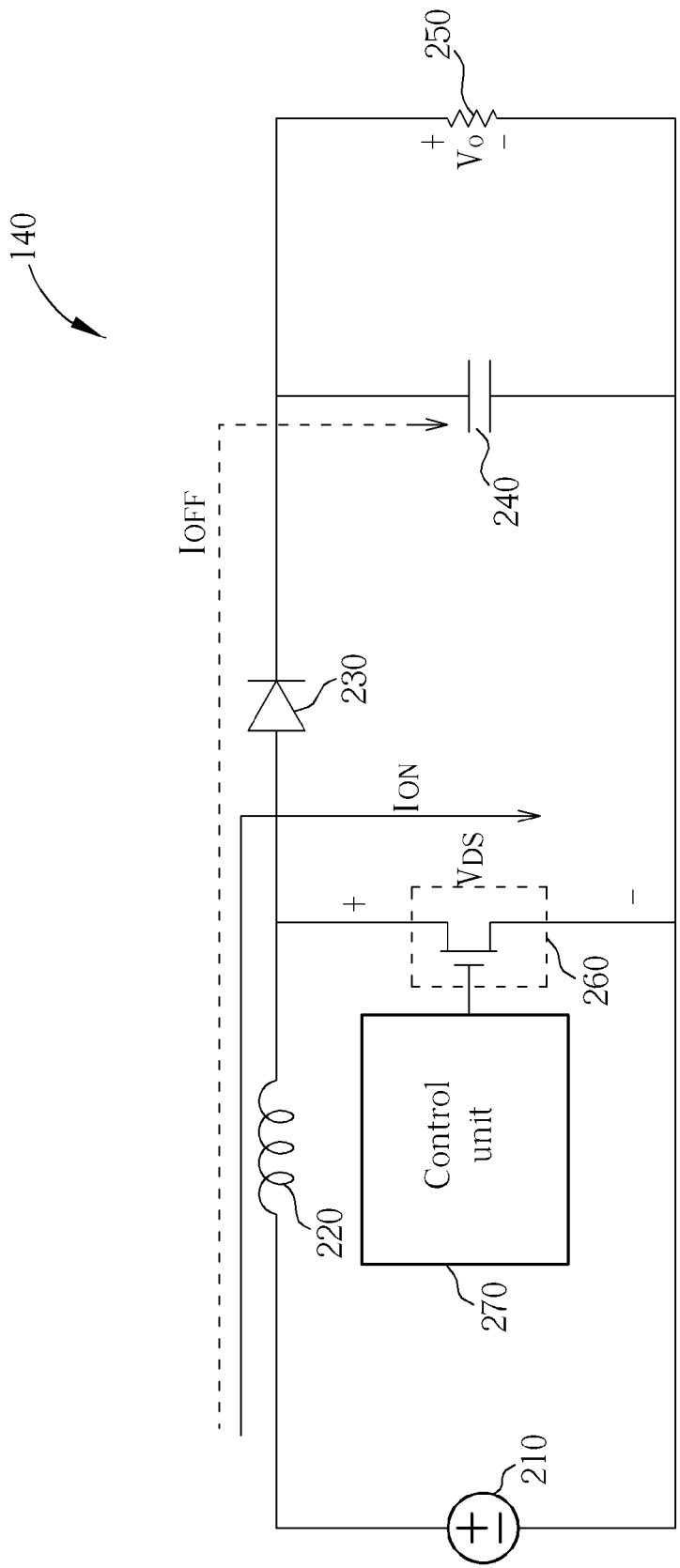
FIG. 2 is a diagram of a conventional switching type boost converter.
Figure 3:
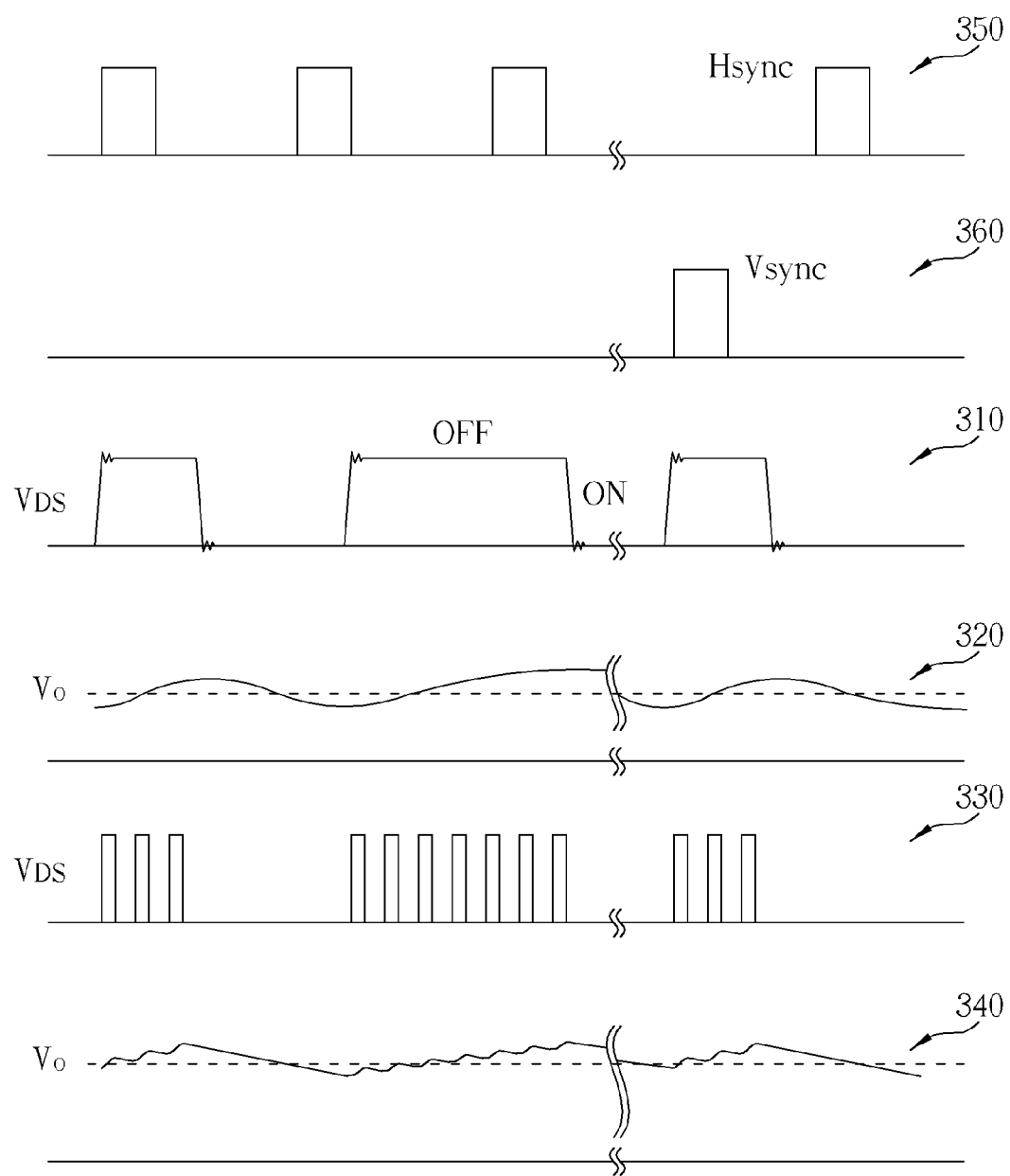
FIG. 3 is a diagram of driving waveform of a power supply of a related art.
Figure 4:
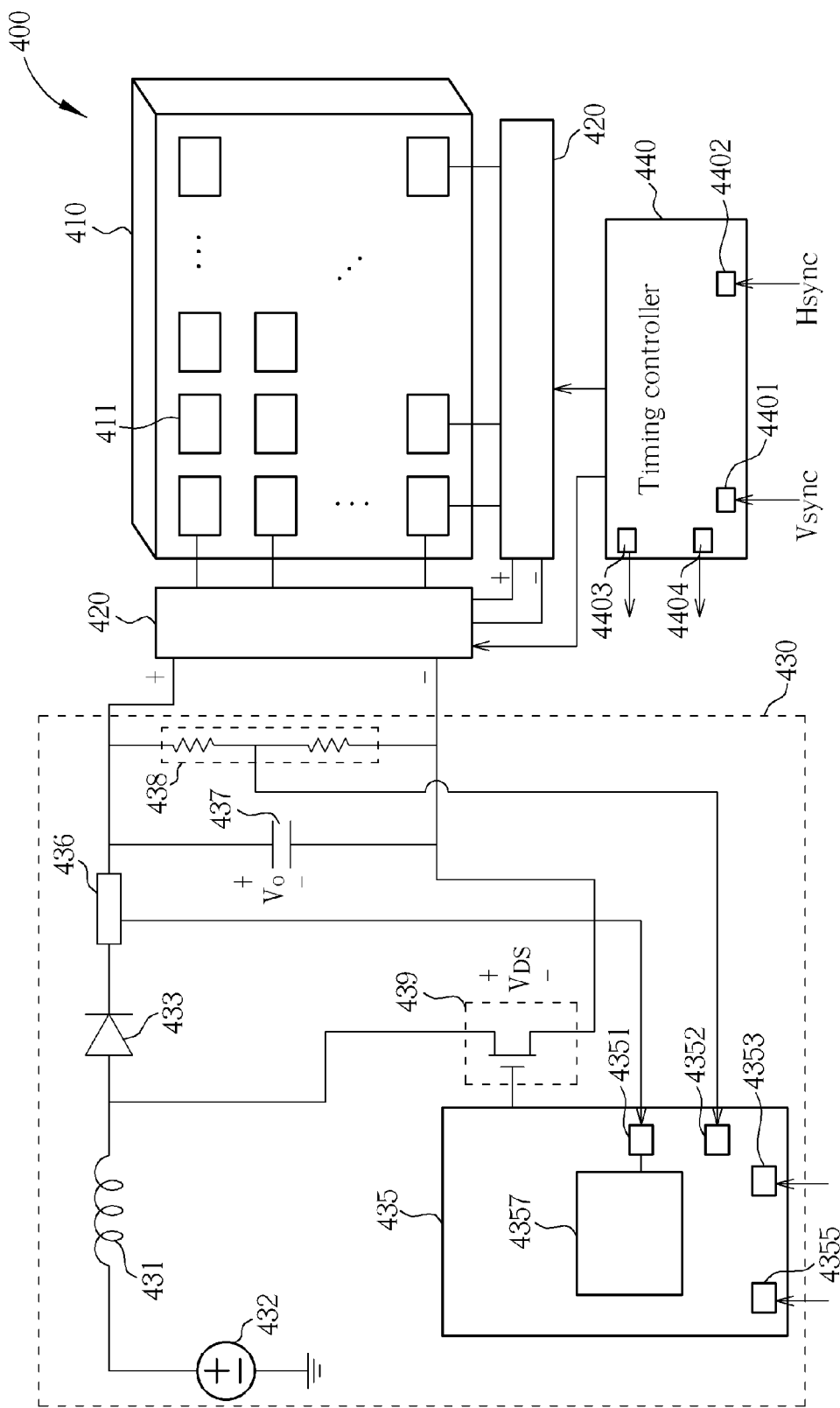
FIG. 4 is an embodiment of a display of present invention.

Please refer to FIG. 4, which is an embodiment of a display of the present invention. Display 400 comprises a panel 410 including a plurality of pixels 411, a pixel driving unit 420, a power supply 430 and a timing controller 440. The power supply 430 comprises a storage inductor 431, an input power source 432, a diode 433, a control unit 435, an output current detection circuit 436, an output voltage detection circuit 438, a switch 439 and an output capacitor 437. The control unit 435 comprises a first input unit 4351, a second input unit 4352, a third input unit 4353, a fourth input unit 4355 and a load analysis unit 4357. The timing controller 440 comprises a vertical synchronization signal input unit 4401, a horizontal synchronization signal input unit 4402, a vertical blanking signal output unit 4403 and a horizontal blanking signal output unit 4404.

The power supply 430 converts power of the input power source 432 to output voltage ($V_o$) for supplying power to the pixel driving unit 420. In this embodiment, the power supply 430 is a boost converter, for example. In other embodiments, the power supply 430 could be a buck converter or a buck-boost converter, for example, however those examples are not used to limit this invention. Moreover, the pixel driving unit 420 is a gate driver and/or a source driver, for example. The input power source 432 is controlled by the control unit 435 via turning the switch 439 ON and OFF to charge the storage inductor 431, and to deliver the power stored in the storage inductor 431 for charging the output capacitor 437. The power stored in the output capacitor 437 can be provided to the pixel driving unit 420. In some embodiments, the control unit 435 and the switch 439 can be independent, while in other embodiments, the control unit 435 and the switch 439 can be embedded in a single integrated circuit (IC).

Please refer to FIG. 4 again. The first input unit 4351 of the control unit 435 receives an output power feedback signal corresponding to the output power of the power supply 430. In an embodiment, the output power can be obtained from output current multiplied by output voltage, and the output current can be obtained from the output current detection circuit 436 series-connected to the output path of the power supply 430. The output current detection circuit 436 can be realized by using a series-connected resistor for the output current to flow through, and by using a differential amplifier to obtain the voltage drop between two ends of the resistor, for example. With the output power feedback signal corresponding to output power of the power supply 430, the power supply 430 can be protected from overloading, or the switch 439 can be controlled cooperatively with the output power feedback signal.

The second input unit 4352 receives an output voltage feedback signal corresponding to the output voltage ($V_o$). The feedback output voltage can be obtained from output voltage detection circuit 438. The output voltage detection circuit 438 is realized by a plurality of resistors for dividing the output voltage and providing the divided voltage to an analog-to-digital converter of the second input unit 4352, for example. According to comparison of the feedback output voltage and a predetermined output reference voltage, the control unit 435 can control the length of charging duration (PWM mode) or the number of charging times (PFM mode) according to the output voltage feedback signal in a specific duration.

In this embodiment, the control unit 435 further comprises a loading analysis unit 4357. The loading analysis unit 4357 decides how to control the switch 439 according to the output power feedback signal and further determines the charging period of the output capacitor 437 by using the input power. Use of the control method according to the output power feedback signal corresponding to the output power of the power supply 430 is disclosed in the following section.

Figure 5:
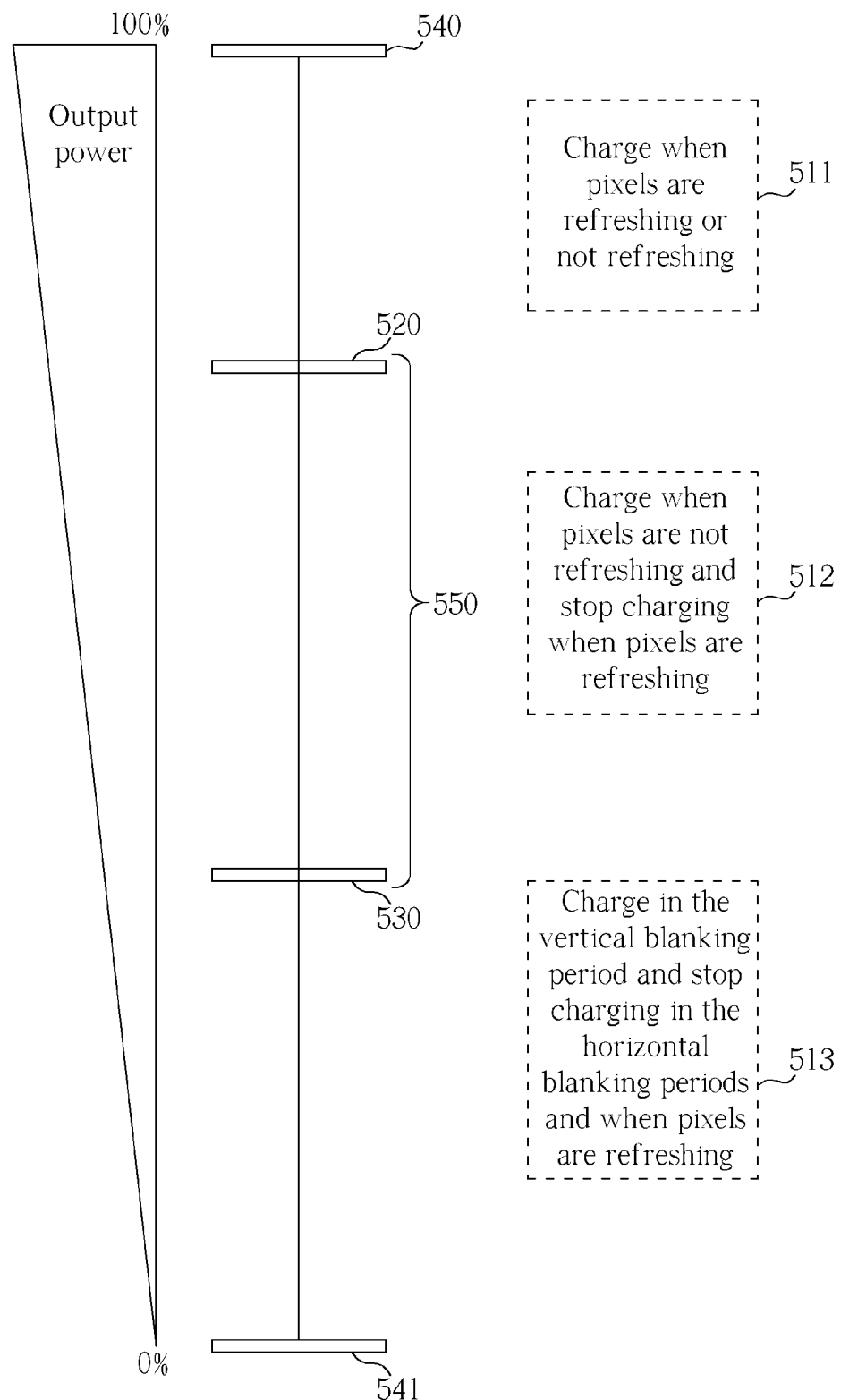
FIG. 5 illustrates the embodiment of the power supply control method with respect to output power in the present invention.

Please refer to FIG. 5 with FIG. 4. FIG. 5 illustrates an embodiment of the power supply control method with respect to output power in the present invention. In this embodiment, when the output power of the power supply 430 is higher than a first predetermined value 520, the input power 432 can charge the output capacitor 437 via the control of the control unit 435 when the pixels 411 of the panel 410 are refreshing or the pixels 411 are not refreshing in a frame period of the display 400. Moreover the first predetermined value 520 can be fifty percent of the rated power of the power supply 430, for example.

Furthermore, when the output power of the power supply 430 is lower than the first predetermined value 520 and higher than a second predetermined value 530, i.e. in a predetermined rage 550, the input power 432 can only charge the output capacitor 437 via control of the control unit 435 when the pixels 411 are not refreshing, for example, during the horizontal blanking periods and the vertical blanking periods in a frame period of the display 400. In other words, the input power 432 will stop charging the output capacitor 437 when the pixels 411 are refreshing in the frame period of the display 400. The first predetermined value 520 is higher than the second predetermined value 530. In this embodiment, the second predetermined value can be twenty percent of the rated power of the power supply 430, for example.

Please refer to FIG. 5 with FIG. 4 again. When the output power of the power supply 430 is lower than the second predetermined value 530, the input power 432 charges the output capacitor 437 in a vertical blanking period of a frame period, in which the pixels 441 is not refreshing, and the input power 432 stops charging the output capacitor 437 when the pixels 411 are refreshing and in a horizontal blanking period of the frame period of the display 400. In other words, the input power 432 can only charge the output capacitor 437 in the vertical blanking period of the frame period when the output power of the power supply 430 is lower than the second predetermined value 530.

The capacitor charging periods mentioned above, such as the vertical blanking period or the horizontal blanking period, are periods in which the input power source 432 can charge the output capacitor 437. In other words, after the control unit 435 decides the charging duration length or the number of charging times according to comparison of the output voltage of the power supply 430 and a reference voltage, which the power supply 430 is designed to generate, the control unit 435 controls the input power source 432 to charge the output capacitor 437 using the capacitor charging periods mentioned above. Briefly speaking, when the output voltage ($V_o$) of the power supply 430 is higher than the reference voltage of the power supply 430, it is unnecessary to charge the output capacitor 437 even when the display 400 is in the capacitor charging periods mentioned above.

Please refer to FIG. 5 with FIG. 4 again. The maximum output power 540 is the maximum output power that the power supply 430 can provide, the rated power of the power supply 430, or the maximum power that the pixel driving unit 420 consumes. The minimum power 541 is the power when the power supply 430 stops delivering output power, or in other words, when the output power of the power supply is zero.

Briefly speaking, the power supply control method in this embodiment comprises the following three modes:

First mode 511: Analyze the output power of the power supply 430. When the output power of the power supply 430 is higher than the first predetermined value 520, input power 432 can charge the output capacitor 437 via control of the control unit 435 when the pixels 411 of the display 400 are refreshing or when the pixels 411 of the display 400 are not refreshing in a frame period of the display 400.

Second mode 512: Analyze the output power of the power supply 430. When the output power of the power supply 430 is lower than the first predetermined value 520 and higher than the second predetermined value 530 so as to be in the predetermined range 550, the input power 432 can only charge the output capacitor 437 when the pixels 411 are not refreshing while stop charging the output capacitor 437 when the pixels 411 of the display 400 are refreshing.

Third mode 513: Analyze the output power of the power supply 430. When the output power of the power supply 430 is lower than the second predetermined value 530, the input power 432 can only charge the output capacitor 437 in the vertical blanking period of the display 400. Charging of the output capacitor 437 is stopped when the pixels 411 of the display 400 are refreshing, and when the display 400 is in the horizontal blanking period.

In another embodiment, the maximum power 540 and the minimum power 541 can respectively be the maximum power and the minimum power consumed by components (pixel driving unit 420 in this embodiment) which power of the power supply 430 is provided to. When the control unit 435 operates in the PFM control mode, there are a plurality of charging durations in a horizontal blanking period and/or a vertical blanking period, where the length of each charging duration is substantially identical. The number of charging durations is determined by comparing the output voltage feedback signal received from the second input unit 4352 and the reference voltage. It is rational that larger voltage drop of the output capacitor 437 will correspond to more charging durations.

Please refer to FIG. 4 again. For the purpose of controlling the power supply 430 in cooperation with the driving of pixels 411 of panel 410, two embodiments are disclosed in this invention. In a first embodiment, the control unit 435 receives the vertical blanking signal and the horizontal blanking signal from the timing controller 440, which respectively indicate the vertical blanking period and the horizontal blanking period of the panel 410. As a result, the control unit 435 can control the input power source 432 to charge the output capacitor 437 during these two periods through indications of these two signals, respectively.

In the first embodiment, the timing controller 440 comprises a vertical synchronization signal input unit 4401 and a horizontal synchronization signal input unit 4402 for receiving the vertical synchronization signal and the horizontal synchronization signal, respectively. To coordinate control of the power supply 430 with refreshing of the pixels 411 of the panel 410, in this embodiment, the timing controller 440 further comprises a vertical blanking signal output unit 4403 and a horizontal blanking signal output unit 4404 for respectively transmitting the vertical blanking signal and the horizontal blanking signal to the third input unit 4353 and the fourth input unit 4355 of the control unit 435, where the third input unit 4353 and the fourth input unit 4355 are respectively electrically coupled to the vertical blanking signal output unit 4403 and the horizontal blanking signal output unit 4404. Briefly speaking, output signals of the vertical blanking signal output unit 4403 and the horizontal blanking signal output unit 4404 respectively indicate that the panel 410 is in the vertical blanking period and the horizontal blanking period to coordinate control of the power supply 430 and refreshing of the pixels 411.

In the second embodiment, the control unit 435 receives the horizontal synchronization signal and/or the vertical synchronization signal from a video data source, and determines the vertical blanking period and the horizontal blanking period by counting a system clock with a counter. In this embodiment, the third input unit 4353 and the fourth input unit 4355 of the control unit 435 can respectively receive the vertical synchronization signal and the horizontal synchronization signal for coordinating control of the power supply 430 and refreshing of the pixels 411.

Figure 6:
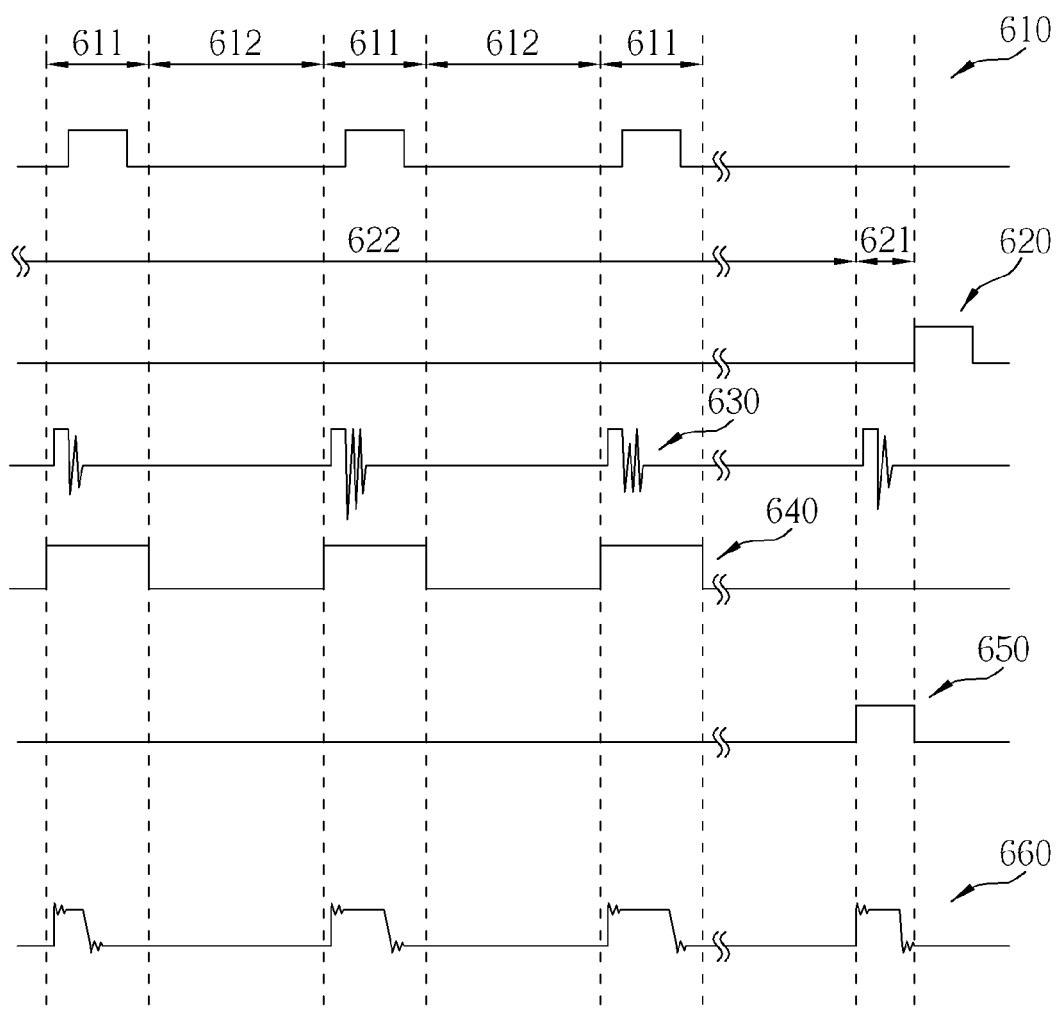
FIG. 6 is the operation waveform of the display in the second mode.
Figure 7:
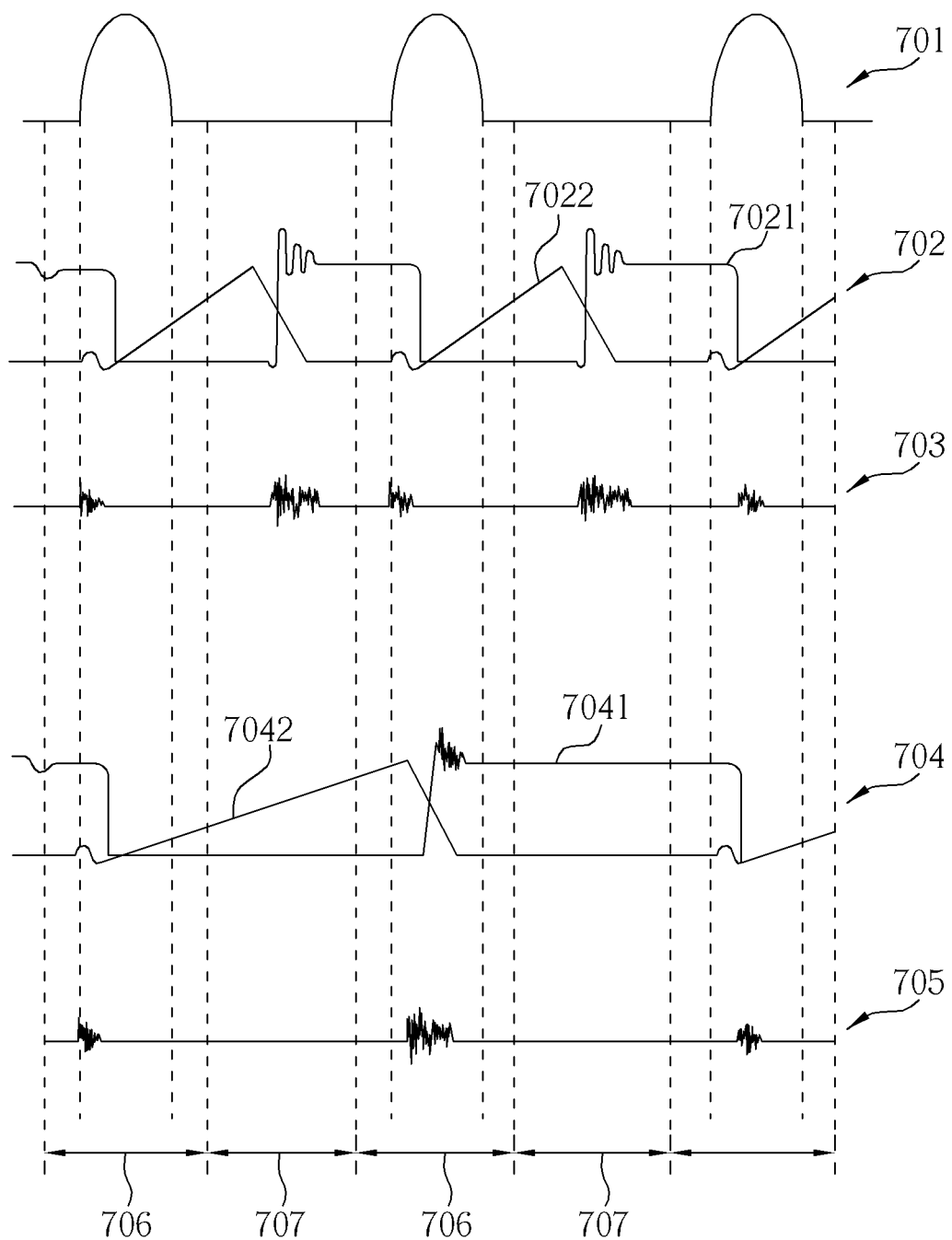
FIG. 7 is a conventional PWM control waveform with cooperatively switching with the horizontal synchronization signal.

Please refer to FIG. 6 with FIG. 4. FIG. 6 shows operation waveforms of the display in the second mode. The waveforms in FIG. 6 include a horizontal synchronization signal 610, a vertical synchronization signal 620, a switch voltage ($V_{DS}$) in PFM mode 630, a horizontal blanking signal 640, a vertical blanking signal 650, and a switch voltage ($V_{DS}$) in PWM mode 660. According to the horizontal synchronization signal 640, operation of the display 400 can be categorized into two kinds of operation period, which are a horizontal blanking period 611 and a horizontal active period 612. Similarly, according to the vertical synchronization signal 620, operation of the display can be categorized into two kinds of operation period, which are a vertical blanking period 621 and a vertical active period 622. In the second mode 512 of FIG. 5, in both PFM control mode and PWM control mode, the input power 432 can only charge the output capacitor 437 when the pixels 411 are not refreshing. Charging of the output capacitor 437 is stopped when the pixels 411 of the display 400 are refreshing.

In PFM control mode, the switch voltage ($V_{DS}$) in PFM mode 630 is generated according to the feedback voltage of the output power feedback signal. In PWM control mode, the switch voltage ($V_{DS}$) in PWM mode 660 is generated according to the feedback voltage of the output power feedback signal. Moreover, the numbers of the pulses of the switch voltage ($V_{DS}$) in PFM mode 630 may be different in each horizontal blanking period 611, while the width of each pulse maybe substantially identical. The pulse width of switch voltage ($V_{DS}$) in PWM mode 660 may be different in each horizontal blanking period 611.

In PFM control mode, the number of charging cycles is decided according to the output voltage ($V_o$) of the power supply 430, and in PWM mode, length of the charging duration (PWM control) is decided according to the output voltage ($V_o$) of the power supply 430. For example, more charging times are used in the PFM control mode for larger voltage drop of the output voltage ($V_o$) of output capacitor 437. In one embodiment, after charging the output voltage ($V_o$) of output capacitor 437 to be higher than the reference voltage of the power supply 430, the switch voltage ($V_{GS}$) in the PFM control mode can be kept at a low level. As the result, the storage inductor 431 does not store power due to the OFF state of the switch 439.

In this embodiment of present invention, high level of the horizontal blanking output signal 640 and the vertical blanking output signal 650 stands for the operation period of the horizontal blanking period and the vertical blanking period of the display 400, respectively. However, the voltage level is not a limitation of this invention. Moreover, for the convenience of illustration in FIG. 6, the scale of the length of each period is modified.

In this embodiment of the present invention, by controlling the power supply 430 of the display 400, power consumption of the display 400 (or the output power of the power supply 430) can be obtained, and the power supply 430 can be controlled according to the obtained information to choose a proper control mode and control the power supply cooperatively with the panel 410. As a result, brightness variation of the display 400 caused by output voltage variation of the output capacitor 437 of the power supply 430 can be reduced. In another aspect, noise from the switching of the power supply 430 is reduced, and the visible stripe on the display caused by the ripple of the output voltage of the power supply 430 is also reduced. Moreover, when the power supply is operated with a very light load, the switching loss of the power supply 430 is reduced because the power supply 430 only switches in vertical blanking periods. Furthermore, when the power supply is operated with a relatively light load, the amplitude of the ripple of the output voltage of the power supply 430 can be reduced because the power supply 430 only switches in vertical blanking periods and horizontal blanking periods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply control method for controlling a power supply of a display, the display including a plurality of pixels, the power supply control method comprising:
   providing the power supply comprising an output capacitor for supplying an output voltage to the display;
   charging the output capacitor during a period of not refreshing the pixels in a frame period of the display, wherein the period of not refreshing the pixels includes at least one of a plurality of horizontal blanking periods and a vertical blanking period of the frame period;
   stopping charging the output capacitor when refreshing the pixels in the frame period of the display; and
   receiving an output power feedback signal corresponding to output power of the power supply.

2. The power supply control method of claim 1, wherein the step of stopping charging the output capacitor is performed when output power of the power supply is lower than fifty percent of rated power of the power supply.

3. The power supply control method of claim 1, wherein the step of charging the output capacitor is performed a plurality of times in at least one of the plurality of the horizontal blanking periods and the vertical blanking period of the frame period.

4. The power supply control method of claim 1 further comprising:
   receiving an output voltage feedback signal corresponding to the output voltage; and
   determining number of times to charge the output capacitor in at least one of the horizontal blanking periods and/or the vertical blanking period of the frame period according to the output voltage feedback signal.

5. A power supply control method for controlling a power supply of a display, the display including a plurality of pixels, the power supply control method comprising:
   providing the power supply comprising an output capacitor for supplying an output voltage to the display;
   charging the output capacitor during a vertical blanking period in a frame period of the display; and
   stopping charging the output capacitor in a plurality of horizontal blanking periods of the frame period and when refreshing the pixels in the frame period of the display.

6. The power supply control method of claim 5, wherein the step of charging the output capacitor includes charging the output capacitor a plurality of times in the vertical blanking period of the frame period.

7. The power supply control method of claim 5, wherein the step of stopping charging the output capacitor in a plurality of horizontal blanking periods and when refreshing the pixels is performed when output power of the power supply is lower than twenty percent of rated power of the power supply.

8. The power supply control method of claim 5 further comprising:
   receiving an output voltage feedback signal corresponding to the output voltage; and
   determining number of times to charge the output capacitor in the vertical blanking period of the frame period according to the output voltage feedback signal.

9. The power supply control method of claim 5 further comprising:
   receiving an output power feedback signal corresponding to output power of the power supply.

10. The power supply control method of claim 5 further comprising:
  receiving a vertical blanking period signal corresponding to the vertical blanking, period; and
  receiving a horizontal blanking period signal corresponding to the plurality of horizontal blanking periods.

11. A display comprising:
  a panel comprising a plurality of pixels arranged in a matrix manner;
  a pixel driving unit for driving the plurality of pixels; and
  a power supply electrically coupled to the pixel driving unit for providing an output voltage to the pixel driving unit, the power supply comprising:
    an input power source;
    an output capacitor for providing the output voltage to the pixel driving unit; and
    a control unit for controlling, the input power source to charge the output capacitor during a vertical blanking period in a frame period of the display and to stop charging the output capacitor in a plurality of horizontal blanking periods in the frame period of the display and when refreshing the pixels.

12. The display of claim 11, wherein the control unit comprises a first input unit for receiving an output power feedback signal corresponding to output power of the power supply.

13. The display of claim 12, wherein the control unit further comprises a second input unit for receiving an output voltage feedback signal corresponding to the output voltage; wherein the control unit determines number of times to charge the output capacitor in the vertical blanking period according to the output voltage feedback signal.

14. The display of claim 13 further comprising a timing controller comprising:
  a vertical synchronization input unit for receiving a vertical synchronization signal;
  a horizontal synchronization input unit for receiving a horizontal synchronization signal;
  a vertical blanking signal output unit for outputting a vertical blanking signal according to the vertical synchronization signal; and
  a horizontal blanking signal output unit for outputting a horizontal blanking signal according to the horizontal synchronization signal;
  wherein the power supply further comprises a storage inductor electrically coupled to the control unit for storing power for charging the output capacitor; and the control unit comprises:
    a third input unit electrically coupled to the vertical blanking signal output umt for receiving the vertical blanking signal; and
    a fourth input unit electrically coupled to the horizontal blanking signal output unit for receiving the horizontal blanking signal.

15. The display of claim 14, wherein the input power source charges the output capacitor a plurality of times in the vertical blanking period.

16. The display of claim 11, wherein the control unit comprises a second input unit for receiving an output voltage feedback signal corresponding to the output voltage; wherein the control unit determines number of times to charge the output capacitor in the vertical blanking period according to the output voltage feedback signal.

17. The display of claim 11, wherein the input power source charges the output capacitor a plurality of times in the vertical blanking, period.

18. The display of claim 11 further comprising a timing controller comprising:
  a vertical synchronization input unit for receiving a vertical synchronization signal;
  a horizontal synchronization input unit for receiving a horizontal synchronization signal;
  a vertical blanking signal output unit for outputting a vertical blanking signal according to the vertical synchronization signal; and
  a horizontal blanking signal output unit for outputting a horizontal blanking signal according to the horizontal synchronization signal;
  wherein the power supply further comprises a storage inductor electrically coupled to the control unit for storing power for charging the output capacitor; and the control unit comprises:
    a third input unit electrically coupled to the vertical blanking signal output unit for receiving the vertical blanking signal; and
    a fourth input unit electrically coupled to the horizontal blanking signal output unit for receiving the horizontal blanking signal.

19. A power supply control method for controlling a power supply of a display, the display including a plurality of pixels, the power supply control method comprising:
  providing the power supply comprising an output capacitor for supplying an output voltage to the display;
  charging the output capacitor a plurality of times during a period of not refreshing the pixels in a frame period of the display, wherein the period of not refreshing the pixels includes at least one of a plurality of horizontal blanking periods and a vertical blanking period of the frame period; and
  stopping charging the output capacitor when refreshing the pixels in the frame period of the display.

20. A power supply control method for controlling a power supply of a display, the display including a plurality of pixels, the power supply control method comprising:
  providing the power supply comprising an output capacitor for supplying an output voltage to the display;
  charging the output capacitor during a period of not refreshing the pixels in a frame period of the display, wherein the period of not refreshing the pixels includes at least one of a plurality of horizontal blanking periods and a vertical blanking period of the frame period;
  stopping charging the output capacitor when refreshing the pixels in the frame period of the display;
  receiving an output voltage feedback signal corresponding to the output voltage; and
  determining number of times to charge the output capacitor in at least one of the horizontal blanking periods and/or the vertical blanking period of the frame period according, to the output voltage feedback signal.

* * * * *